United States Patent [19]
Hafner

[11] Patent Number: 5,210,496
[45] Date of Patent: May 11, 1993

[54] METHOD AND CIRCUIT ARRANGEMENT FOR INTERMITTENT APPLICATION OF A VOLTAGE TO AN ELECTRODE

[75] Inventor: Peter Hafner, Liestal, Switzerland

[73] Assignee: Endress & Hauser Flowtec AG, Switzerland

[21] Appl. No.: 594,316

[22] Filed: Oct. 9, 1990

Related U.S. Application Data

[63] Continuation-in-part of Ser. No. 336,220, Apr. 11, 1989, abandoned.

[30] Foreign Application Priority Data

Apr. 13, 1988 [DE] Fed. Rep. of Germany ....... 3812309

[51] Int. Cl.$^5$ ............................................. G01N 27/02
[52] U.S. Cl. .................................. 324/439; 204/406; 324/444
[58] Field of Search ............... 324/439, 425, 445, 444; 204/406, 153.1, 402; 73/861.16, 861.17

[56] References Cited

U.S. PATENT DOCUMENTS

| | | | |
|---|---|---|---|
| 3,177,709 | 4/1965 | Fischer. | |
| 4,077,861 | 3/1978 | Lauer | 204/402 |
| 4,287,774 | 9/1981 | Grebe, Jr. et al. | 73/861.17 |
| 4,317,705 | 3/1982 | Hamada et al. | 204/409 |
| 4,496,454 | 1/1985 | Berger | 204/402 |
| 4,676,112 | 6/1987 | Uematsu et al. | 73/861.17 |
| 4,804,443 | 2/1989 | Newman et al. | 204/406 |
| 4,805,624 | 2/1989 | Yao et al. | 204/406 |
| 4,950,378 | 8/1990 | Nagata | 204/406 |
| 4,969,363 | 11/1990 | Mochizuki | 324/439 |
| 5,059,908 | 10/1991 | Mina | 324/444 |

FOREIGN PATENT DOCUMENTS

WO88/07194 9/1988 PCT Int'l Appl.

OTHER PUBLICATIONS

Flowtec AG, "Durchfluss Fibel", pp. 15–28, 1985, Germany.

Primary Examiner—Jack B. Harvey
Assistant Examiner—Maura K. Regan
Attorney, Agent, or Firm—Barnes & Thornburg

[57] ABSTRACT

A method and a circuit arrangement for intermittent application of an electrical DC or AC voltage by a switch to an electrode in contact with a material, in particular for cleaning the electrode. The method is suitable in particular for use in electromagnetic flow measuring technology. The objective is to protect the electrode from parasitic capacitances present in the switch and interference voltages occurring therein. This is achieved in that at least in the period in which no voltage is applied to the electrode, the electrical potential of the electrode is coupled to the terminal of the switch which is not allocated to the electrode. Impedance converters are suitable as coupling elements.

15 Claims, 2 Drawing Sheets

METHOD AND CIRCUIT ARRANGEMENT FOR INTERMITTENT APPLICATION OF A VOLTAGE TO AN ELECTRODE

This application is a continuation-in-part of copending application Ser. No. 07/336,220, filed Apr. 11, 1989, now abandoned.

BACKGROUND AND SUMMARY OF THE INVENTION

The invention relates to a method and a circuit arrangement for intermittent application of an electrical DC or AC voltage by means of a switch element to an electrode which is in contact with a material or substance. The material can lead to soiling of the electrode surface. The dirt layer forming on the electrode surface can electrically insulate the electrodes in such a manner that their functionability is impaired.

An electrical cleaning method is known in which to the electrodes a DC or AC voltage of adequate magnitude is intermittently applied and this leads to the cleaning thereof. The intermittent application of the cleaning voltage is effected with switches (e.g. relays) which connect the electrode to a correspondingly dimensioned voltage source. However, with this additional wiring the current or voltage level carried by the electrode is in particular capacitively loaded. This is troublesome in particular in magnetic-inductive flow measurement in which electrodes contacting a flow medium generate a measuring signal, for the electrode represents a voltage source with internal resistance which depends in particular on the geometry of the magnetic-inductive pickup and the conductivity of the medium. The higher the value of this internal resistance the more sensitive the electrode becomes as signal source to external circuitry. In addition, switches can generate interfering voltages which have undesirable effects on the electrode signal. Adequate magnitude of voltage is that amount of voltage necessary for cleaning off the electrodes by the aforementioned known method so as to peel or scale off deposits or decompose contaminants. With a serial resistor of 4700Ω to the electrode, a diameter of 8 mm, and an area of 50 mm², a cleaning voltage of +5 volts to +15 volts would normally provide the necessary cleaning function to remove conductive sheets covering the electrode and liner. A voltage of −5 volts to −15 volts would normally be used to prevent oxidation of an electrode such as a tantalum electrode. The voltage pulse should be applied for about 700 ms every 10 minutes. The voltage pulse duration can be varied depending upon the degree of soiling of the electrodes.

The invention is thus based on the problem in applying a voltage in the manner set forth at the beginning of freeing the electrode and/or the connecting/signal lines from interfering influences originating from the switch for applying the voltage.

A method according to the invention for solving this problem resides in that—at least during the period in which no voltage is applied—the electrical potential of the electrode is coupled approximately to the terminal or terminals of the switch element which are not allocated to the electrode. A terminal of this switch not connected to the electrode or the line thereof is operated at an electrical potential which at least approximately corresponds to the potential of the electrode and/or the line thereof. As a result, in the disconnected (interrupting the connection to the cleaning voltage) state of the switch potential differences between the terminal for example allocated to the cleaning voltage and the terminal allocated to the electrode are held negligibly small. Consequently, inevitable capacitive components of the switch can no longer inadmissibly load the electrode signal. The means for coupling the electrode potential to the switch are expediently implemented with active components, for example operational amplifiers. This gives the advantage that any interfering voltages originating from the switch element can be substantially compensated by the output of the active component.

The method according to the invention can be advantageously used in cases where electrodes are in contact with flowing medium for measuring purposes and thereby become soiled. This is the case in particular in magnetic-inductive flow measurement where the electrodes serve to generate a measuring signal. In these cases said method can be incorporated as follows into a measuring cycle:

a measuring signal originating from the electrodes is stored prior to the application of the cleaning voltage and output as measured value;

the cleaning voltage is applied for a predetermined selectable duration and in predetermined selectable intervals t the electrodes;

after the disconnection of the cleaning voltage restarting of the measuring operation is delayed by a period in which the electrochemical conditions at the cleaned electrode can become normal; and after said period the measuring operation is restarted.

In a circuit designed for the method according to the invention an impedance converter with high input and low output impedance is provided, the output of which is connected to a terminal of the switch not connected to the electrode. The input of the impedance converter can either be directly connected to the electrode or the connecting signal line thereof or can be brought approximately to the electrode potential by means of separate coupling members (e.g. operational amplifier circuits).

According to an embodiment of the invention the DC or AC voltage source for generating the cleaning voltage is connected to the input of the impedance converter, parallel to the supply line of the electrode potential. Between the output of the voltage source and the input of the impedance converter switch means may be provided which are intermittently driven by a time control.

According to an alternative embodiment a terminal of the switch not connected to the electrode or the line thereof is allocated both to the output of the voltage source and to the output of the impedance converter. This can be effected on the one hand by a changeover switch which switches the output of the cleaning voltage source to and fro intermittently between a terminal to the electronics and the output of the impedance converter. On the other hand, the output of the impedance converter can permanently contact a terminal of the switch not connected to the electrode, the cleaning voltage being intermittently switched through to the output of the impedance converter. According to a further development of the invention the voltage source for generating the cleaning voltage and the impedance converter are integrated in their circuitry to form a unit. This can for example be done by an operational amplifier which is connected with a feedback resistance network and in which at least one resistance value influencing the gain is intermittently variable. In such a case, during the time phase in which no cleaning takes place, the operational amplifier is operated as impedance converter with the gain 1; during the cleaning phase the gain is increased to a greater value corresponding to the necessary cleaning voltage by influencing said resistance. A particularly simple and economical embodiment of the circuit arrangement according to the invention resides in that the switch for the application of the cleaning voltage is implemented by one or more diodes. If AC voltage is employed for the electrode cleaning a diode circuit is expedient in which two diodes are arranged antiparallel to each other. A further advantage resides in that the impedance converter can be additionally used as potential driver for any electrode shields or other shields.

The circuit arrangement according to the invention is particularly suitable for use in magnetic-inductive flow meters or in measuring material monitoring devices in which in each case electrodes in contact with medium are employed for generating a measuring signal.

BRIEF DESCRIPTION OF THE DRAWINGS

Further advantages and embodiments of the invention will be apparent from the subsidiary claims and the description with the aid of the drawings, wherein

DETAILED DESCRIPTION OF THE DRAWINGS

Figure 1:
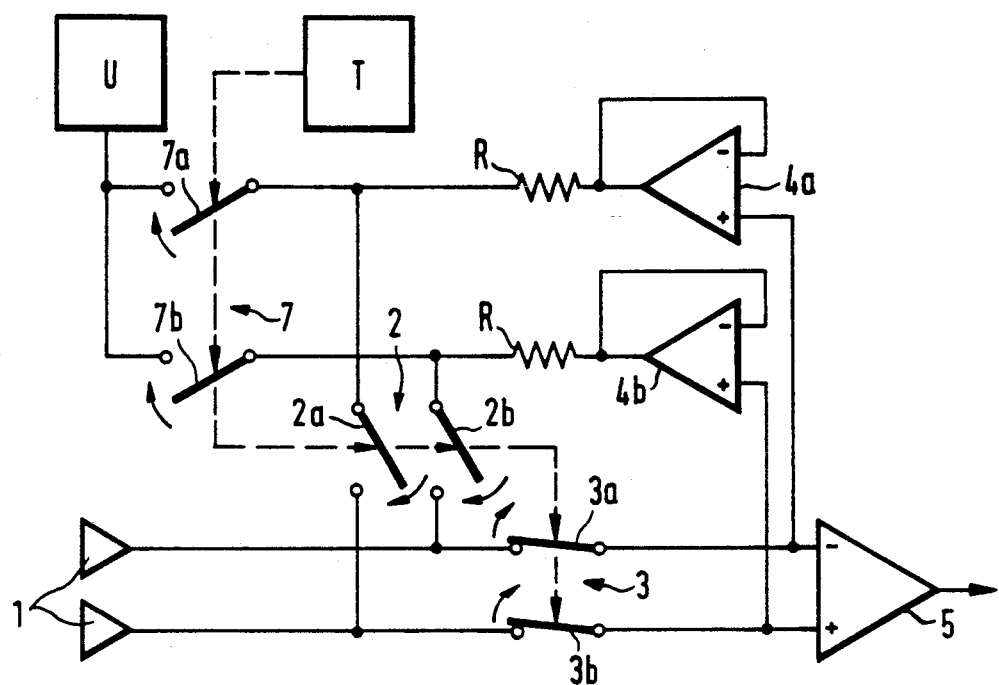
FIG. 1 shows a circuit arrangement according to the invention.

Identical circuit parts are provided in the drawings with identical reference numerals.

Figure 2:
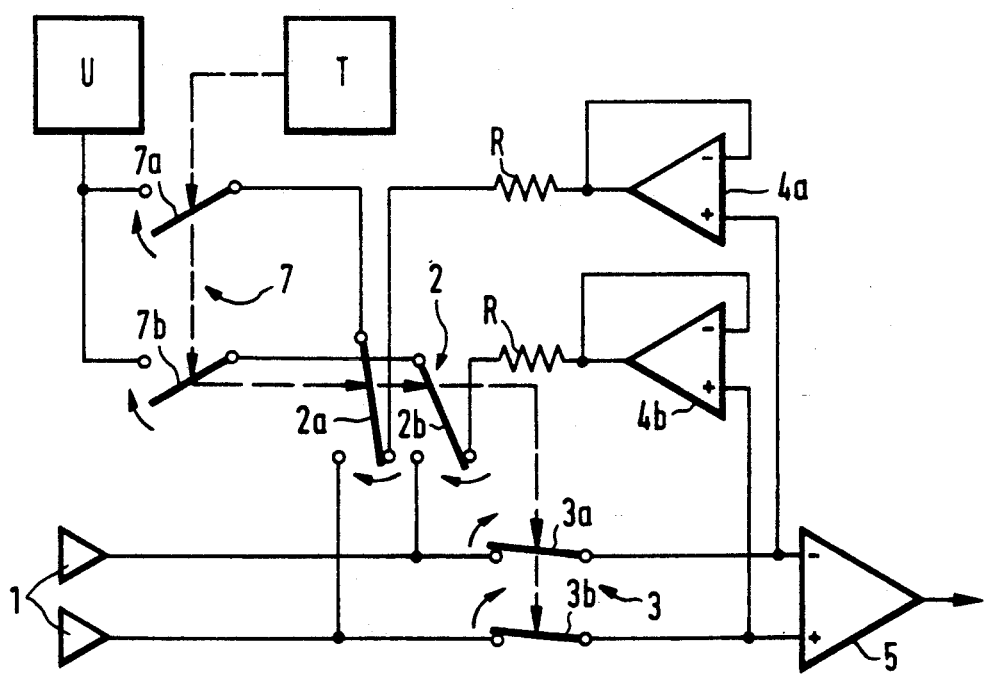
FIG. 2 shows a further circuit arrangement according to the invention.
Figure 3:
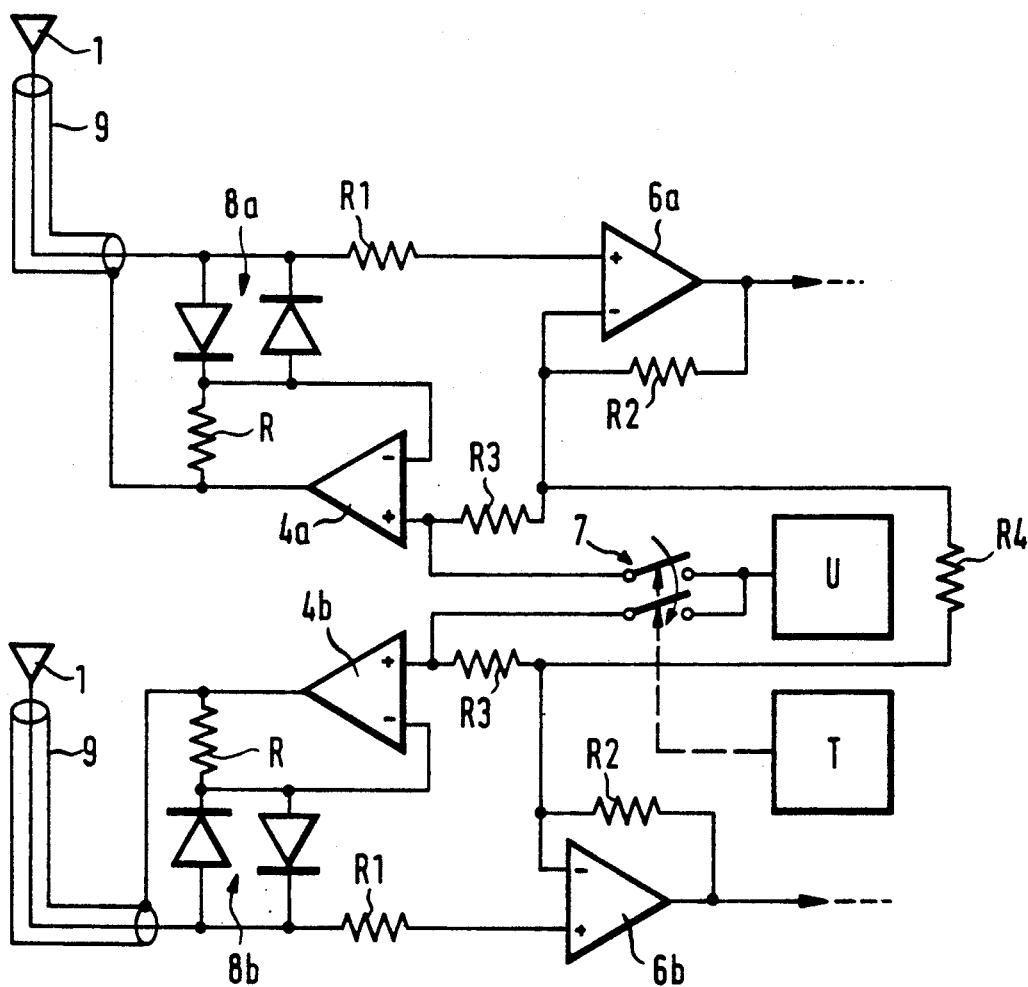
FIG. 3 shows a further circuit arrangement according to the invention.

FIGS. 1 to 3 each show a circuit arrangement for two electrodes, representing a typical case of magnetic-inductive flow measurement.

According to FIG. 1 the two electrodes 1 are connected to a first switch unit 2 and a second switch unit 3 which each have two contact elements 2a, 2b, 3a, 3b constructed as circuitbreakers. Furthermore, a third switch unit 7 having two contact elements 7a, 7b is provided which is arranged between a voltage source U for generating the voltage for the electrode cleaning and the first switch unit 2. In accordance with the known electrical cleaning method of intermittently applying DC or AC voltage of adequate magnitude to an electrode so as to peel or scale off deposits or decompose contaminants on the electrode, the voltage source U generates a cleaning voltage of +5 volts to +15 volts to remove conductive sheets covering an electrode. A voltage of −5 volts to −15 volts is generated if it is desired to prevent oxidation of the electrode. These voltage values are provided for an electrode having a serial resistor of 4700 Ω, a diameter of 8 mm, and an area of 50 mm². The voltage pulse is applied for about 700 milliseconds every 10 minutes. Other voltage magnitudes may be applied in accordance with the known method depending upon the resistance and dimensions of the electrode. Further, the pulse duration can be varied depending upon the degree of soiling of the electrode.

The two contact elements 2a, 2b, 3a, 3b, 7a, 7b of each switch unit 2, 3, 7 are allocated respectively to one of the two electrodes 1. Their movement directions are indicated in FIG. 1 by arrows. Their movements are controlled synchronously in time with respect to each by a time control T. The terminals of the two contact elements 3a, 3b of the second switch unit 3 which are not connected to the electrode 1 are respectively connected to an input of a first and a second impedance converter 4a, 4b. The impedance converters have a high input and a low output impedance and may be implemented as feedback operational amplifiers. The two said terminals are additionally each connected to an input of a differential amplifier 5 for processing the electrode signals. The two impedance converters 4a, 4b each have at their outputs a resistor R for limiting the current. The resistors R connect the outputs of the impedance converters 4a, 4b to those terminals of the contact members 2a, 2b; 7a, 7b, of the first and third switch units 2, 7, respectively, which are not connected to the electrodes 1 or to the voltage source U.

The mode of operation of the circuit according to FIG. 1 will now be briefly explained. In the position shown therein the first and the third switch units 2 and 7 interrupt the connection from the voltage source U to the electrodes whilst the second switch unit 3 establishes a connection of the electrodes 1 to the differential amplifier 5. The electrodes are thus not in the cleaning mode but in the measuring mode. The second switch unit 3 serves on application of the cleaning voltage U to keep the latter away from the differential amplifier 5 to avoid excessive loading thereof.

Now, if the two electrodes 1 are to be electrically Cleaned the time control T drives the first and third switch units 2 and 7 in such a manner that their contact elements 2a, 2b, 7a, 7b close to supply the voltage U to the electrodes 1 for the cleaning thereof. At the same time the contact electrodes 3a, 3b of the second switch unit are brought into the interruption position.

In normal measuring operation as shown in FIG. 1 the impedance converters 4a, 4b ensure that during measuring operation almost no potential differences are present between the electrode-side terminals of the first switch unit 2 and its terminal members remote from the electrodes 1. As a result, almost no voltage changes occur via the terminals of the switch unit 2 and consequently parasitic capacitances present in the switch unit cannot have any effect on the signals tapped from the electrodes 1. The circuit arrangement according to FIG. 2 differs from that according to FIG. 1 substantially in that in the first switch unit 2 the two contact elements 2a, 2b are formed as changeover switches between the outputs of the impedance converters 4a, 4b and the electrodes 1, the movable contact arms being connected to the third switch unit 7. In the position shown measuring operation obtains, i.e. no cleaning voltage is applied to the electrodes 1. Interfering capacitances which are present in the first switch unit are substantially rendered ineffective by the potential supply through the two impedance converters 4a, 4b, as explained before in connection with FIG. 1.

The circuit arrangement according to FIG. 3 differs from that according to FIG. 1 substantially in the configuration of the switch unit and the provision of a first and second amplifier 6a, 6b. Two electrodes 1 are each connected via a resistor R1 to the non-inverting inputs of a respective operational amplifier 6a, 6b. The outputs of the two operational amplifiers 6a, 6b are each fed back via a resistor R2 to the inverting inputs thereof. The inverting input of the first operational amplifier 6a is connected via a resistor R4 to the inverting input of the second operational amplifier 6b. Furthermore, the two inverting inputs of the two operational amplifiers 6a, 6b are each connected via a resistor R3 to the non-inverting inputs of a first impedance converter 4a and a second impedance converter 4b, respectively. The output of a voltage source U is applied directly to the non-inverting inputs of the two impedance converters 4a, 4b via a third switch unit 7. The third switch unit 7 is in operative connection with a time control T. The output of the first impedance converter 4a is connected to a first diode pair 8a and the output of the second impedance converter 4b is connected to a second diode pair 8b. The diode pairs 8a, 8b are each formed from two individual diodes. Said two diodes are arranged in antiparallel connection to each other, i.e. the anode of the first diode is connected to the cathode of the second diode whilst the anode of the second diode is connected to the cathode of the first diode. The outputs of the impedance converters 4a, 4b are supplied via current-limiting resistors R respectively to an anode and a cathode of a diode pair 8a, 8b. The terminals of the diodes of the first diode pair 8a not connected to the output of the first impedance converter 4a are connected to one of the two electrodes 1. This applies accordingly to the other of the two electrodes 1. Shields 9 surrounding the electrodes 1 are electrically connected directly to the outputs of the impedance converters 4a, 4b.

The mode of operation of the circuit according to FIG. 3 will now be briefly explained. The switch unit 7 is in the open (interrupting) state in the position drawn. This means that the output of the voltage source U is not connected to the inputs of the two impedance converters 4a, 4b. On the contrary, the electrode potential at which the two electrodes 1 lie is applied at least approximately to the inputs of the impedance converters 4a, 4b. This is because the electrode potential is applied via the resistors R1 to the non-inverting inputs of the first and second operational amplifiers 6a, 6b. The outputs of the two operational amplifiers 6a, 6b are fed back respectively via resistors R2 to the inverting inputs.

As a result the voltage differences between the non-inverting inputs and the inverting inputs of the respective operational amplifiers 6a, 6b are regulated approximately to zero so that substantially an electrode potential is applied to the inverting inputs of the operational amplifiers 6a, 6b. Said potential is applied via the resistors R3 to a respective input of he impedance converters 4a, 4b. The latter transfer their input signals approximately with the gain one to their outputs. The terminals of the diode pairs 8a, 8b connected thereto are thus at the same electrical potential as their terminals directly connected to the electrodes. Dynamically occurring voltage drops between the terminals of the diode pairs 8a, 8b, to which parasitic capacitances could respond, no longer occur. Any interference voltage originating from the diodes due to temperature drift, etc., are compensated by the outputs of the impedance converters. The measuring signal derived from the electrodes via the resistors R1 is accordingly substantially uncoupled from interfering influences of the diode pairs 8a, 8b. For electrical cleaning of the electrodes 1 the time control T generates a signal which causes the third switch unit 7 to apply the output of the voltage source in to an input of each of the impedance converters 4a, 4b. The impedance converters transfer the voltage applied by the voltage source in with the gain 1. This means that a diode of each of the two diode pairs 8a, 8b on reaching its threshold value is moved to the forward conductive state. The cleaning voltage originating from the voltage source U thus passes to the electrodes 1. If the voltage source U generates a bipolar AC voltage then in each of the diode pairs 8a, 8b the one diode is set alternately with the other in the forward conductive state. Due to the antiparallel arrangement of the diodes of the diode pairs 8a, 8b the electrodes can thus be subjected to an AC voltage as cleaning voltage.

As shown in FIG. 3 the impedance converters 4a, 4b may be additionally employed to drive the shields 9 to the electrode potential to compensate if necessary shield capacitances and shield noise.

What is claimed is:

1. An apparatus for cleaning an electrode used to generate a measurement signal, the apparatus comprising:

a voltage source;

one normally open switch including a first terminal coupled to the voltage source and a second terminal;

another normally open switch including a first terminal coupled to the second terminal of the first normally open switch and a second terminal coupled to the electrode;

means for selectively closing the normally open switches for a predetermined time to couple the voltage source to the electrode to clean the electrode; and an impedance converter including an input having a relatively high input impedance and an output having a relatively low output impedance, the electrode being coupled to the input of the impedance converter, and the output of the impedance converter being coupled to the first terminal of the other normally open switch so that substantially no potential difference exists between the first and second terminals of the other normally open switch, thereby increasing the accuracy of the measurement signal from the electrode.

2. The apparatus of claim 1, further comprising means coupled to the electrode for generating the measurement signal.

3. The apparatus of claim 2, further comprising a normally closed switch coupled between the electrode and the generating means, the normally closed switch coupling the electrode to the generating means when the normally open switches are open, and means for opening the normally closed switch when the normally open switches are closed to isolate the electrode from the generating means when the voltage source is coupled to the electrode.

4. The apparatus of claim 3, wherein the means for opening the normally closed switch returns the normally closed switch to its normally closed position after the normally open switches return to their normally open positions.

5. The apparatus of claim 4, wherein the means for opening the normally closed switch delays returning the normally closed switch to its normally closed position by a predetermined delay time after the normally open switches return to their normally open positions.

6. The apparatus of claim 1, further comprising a current limiting resistor coupled between the output of the impedance converter and the first terminal of the other normally open switch.

7. The apparatus of claim 1, wherein the output of said impedance converter is also coupled to a shield of a signal line which is coupled to said electrode.

8. The apparatus of claim 1, wherein the output of the impedance converter is also coupled to the second terminal of the one normally open switch.

9. The apparatus of claim 1, wherein the other normally open switch is a changeover switch which includes a first terminal coupled to the second terminal of the one normally open switch, a second terminal coupled to the electrode, and a third terminal coupled to the output of the impedance converter, the other normally open switch being movable from a first position in which the first terminal is coupled to the second terminal to couple the voltage source to the electrode to a second position in which the first terminal is coupled to the third terminal to couple the output of the impedance converter to the first terminal of the other normally open switch.

10. An apparatus for cleaning an electrode used to generate a measurement signal, the apparatus comprising:
   a voltage source;
   means for generating an output signal from the electrode, the generating means being coupled to the electrode;
   an impedance converter including an input having a relatively high input impedance and including an output having a relatively low output impedance;
   a normally open switch including a first terminal coupled to the voltage source and a second terminal coupled to the input of the impedance converter;
   means for selectively closing the normally open switch for a predetermined time to couple the voltage source to the input of the impedance converter;
   a current limiting resistor coupled to the output of the impedance converter; and
   a pair of diodes coupled together in antiparallel, the pair of diodes including a first common terminal coupled to the current limiting resistor and to the input of said impedance converter and including a second common terminal coupled to the electrode to increase the accuracy of the measurement signal generated by the generating means.

11. The apparatus of claim 10, wherein the generating means includes an operational amplifier having a non-inverting input which is coupled to said electrode and having an inverting input which is coupled to the input of said impedance converter, the inverting input of the operational amplifier also being coupled to an output of the operational amplifier.

12. The apparatus of claim 10, wherein said impedance converter and the voltage source include an amplifier unit having a gain which is intermittently variable between 1 and a value greater than 1.

13. The apparatus of claim 10, wherein the output of said impedance converter is also coupled to a shield of a signal line which is coupled to the electrode.

14. The apparatus of claim 10, wherein the impedance converter includes an operational amplifier having an inverting input and a non-inverting input, the second terminal of the switch being coupled to the non-inverting input of the impedance converter and the first common terminal of the pair of diodes being coupled to the inverting input of said impedance converter.

15. The apparatus of claim 14, wherein the input of the generating means is also coupled to said non-inverting input of the other of impedance converter.

* * * * *